Figure 3:
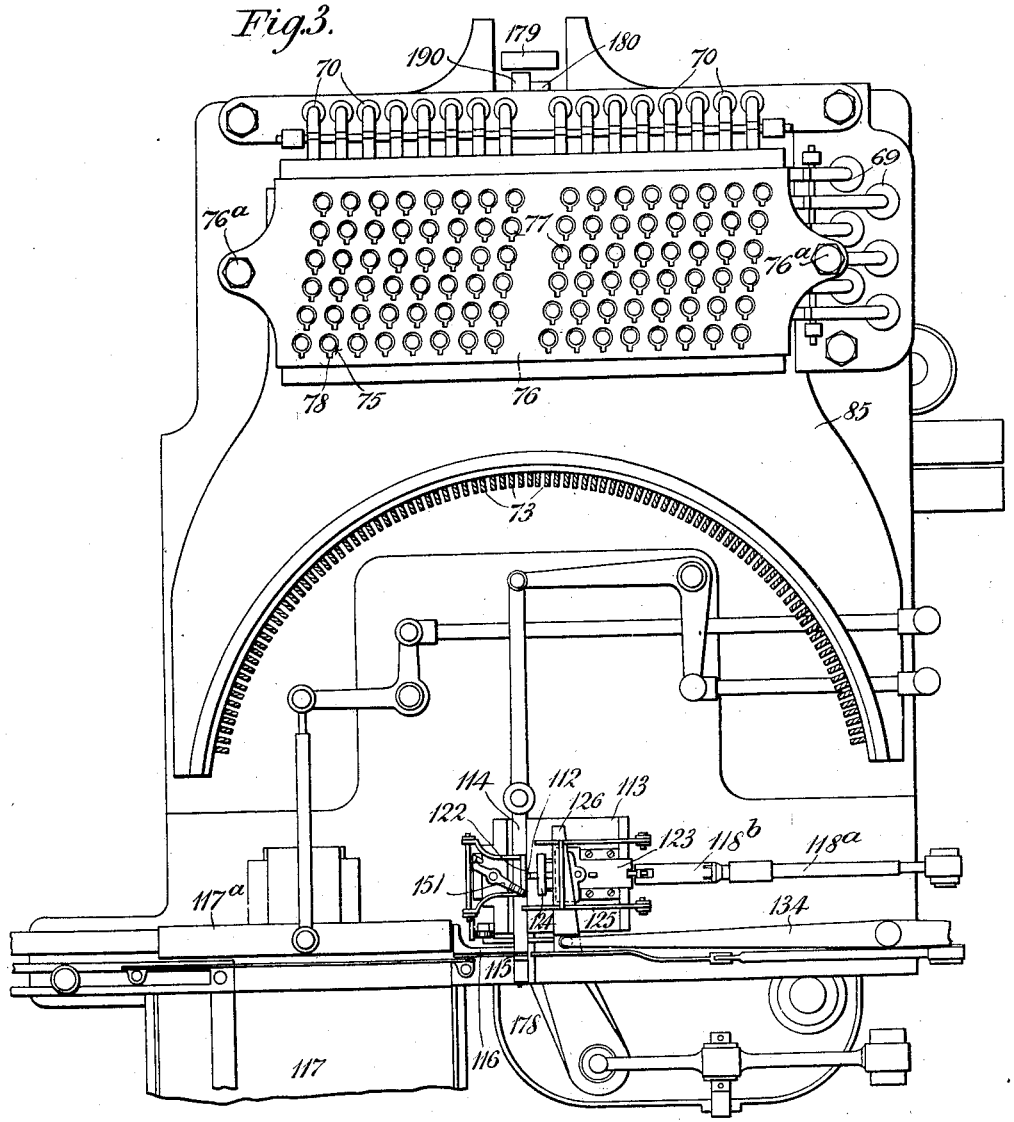

No. 897,358. PATENTED SEPT. 1, 1908.
R. C. ELLIOTT.
TYPE CASTING AND COMPOSING MACHINE.
APPLICATION FILED JUNE 9, 1908.
11 SHEETS—SHEET 1.
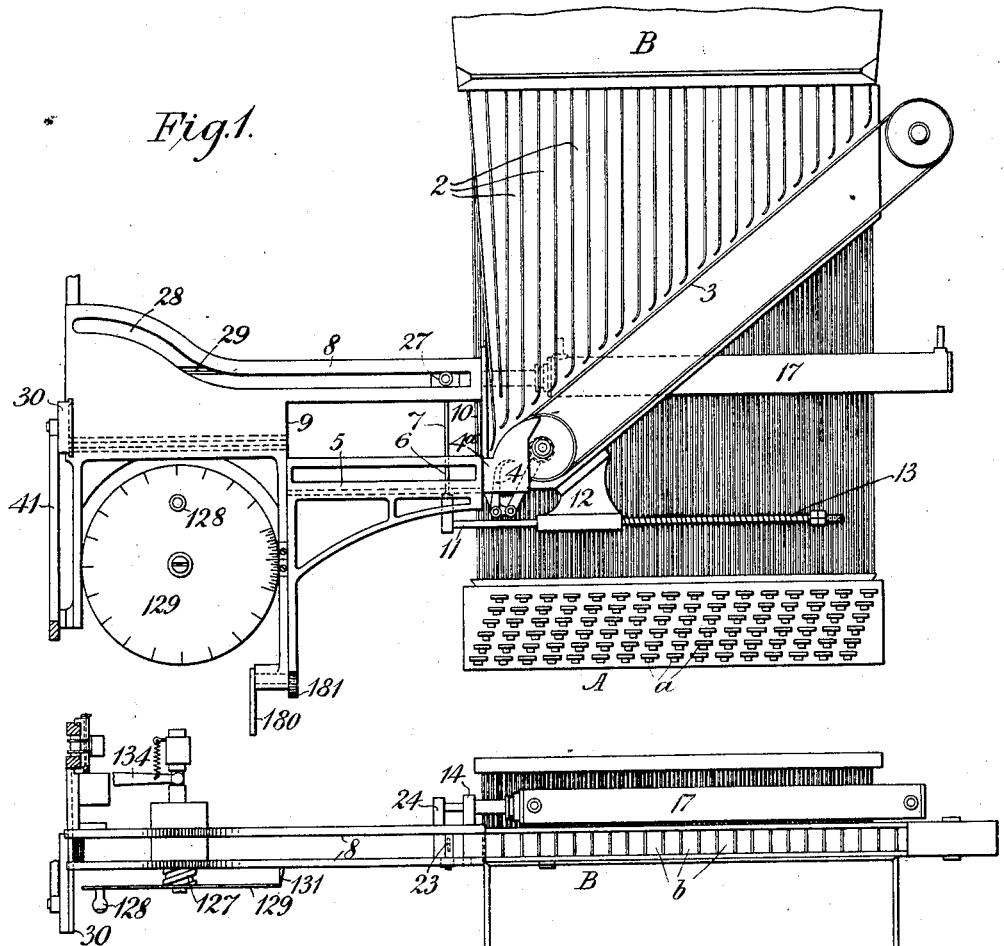
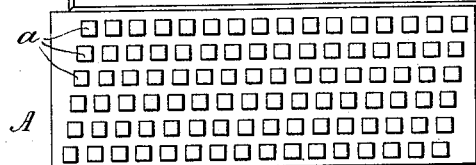
Witnesses.—
Thomas Durant
Paul Bushnell
Inventor.—
Richard C. Elliott
by J. B. Church
his atty No. 897,358. PATENTED SEPT. 1, 1908.
R. C. ELLIOTT.
TYPE CASTING AND COMPOSING MACHINE.
APPLICATION FILED JUNE 9, 1908.
11 SHEETS—SHEET 2.

Witnesses.—
Thomas Durant
Paul Bushnell.

—Inventor.—
Richard C. Elliott
by J. B. Church
his atty

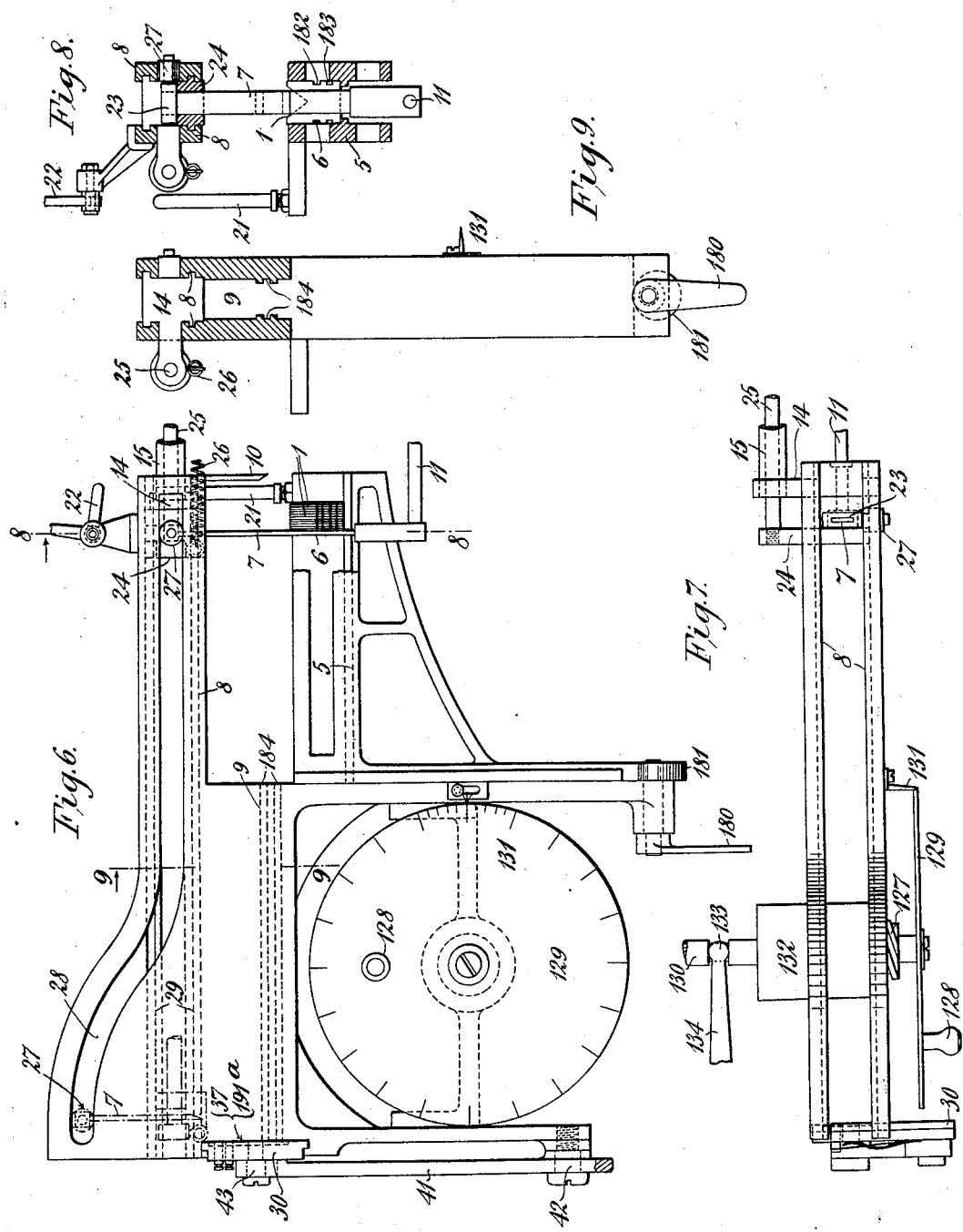

No. 897,358. PATENTED SEPT. 1, 1908.
R. C. ELLIOTT.
TYPE CASTING AND COMPOSING MACHINE.
APPLICATION FILED JUNE 9, 1908.
11 SHEETS—SHEET 4.

—Witnesses.—
Thomas Durant
Paul Ashnell

—Inventor:—
Richard C. Elliott
by J. B. Church
his atty.

No. 897,358. PATENTED SEPT. 1, 1908.
R. C. ELLIOTT.
TYPE CASTING AND COMPOSING MACHINE.
APPLICATION FILED JUNE 9, 1908.
11 SHEETS—SHEET 5.
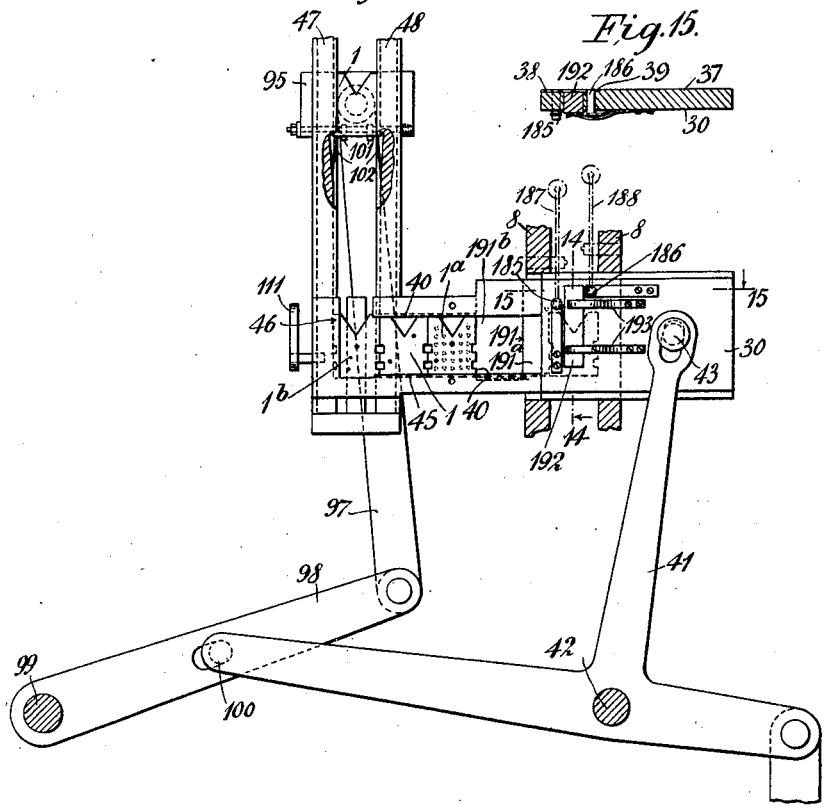

No. 897,358. PATENTED SEPT. 1, 1908.
R. C. ELLIOTT.
TYPE CASTING AND COMPOSING MACHINE.
APPLICATION FILED JUNE 9, 1908.
11 SHEETS—SHEET 6.
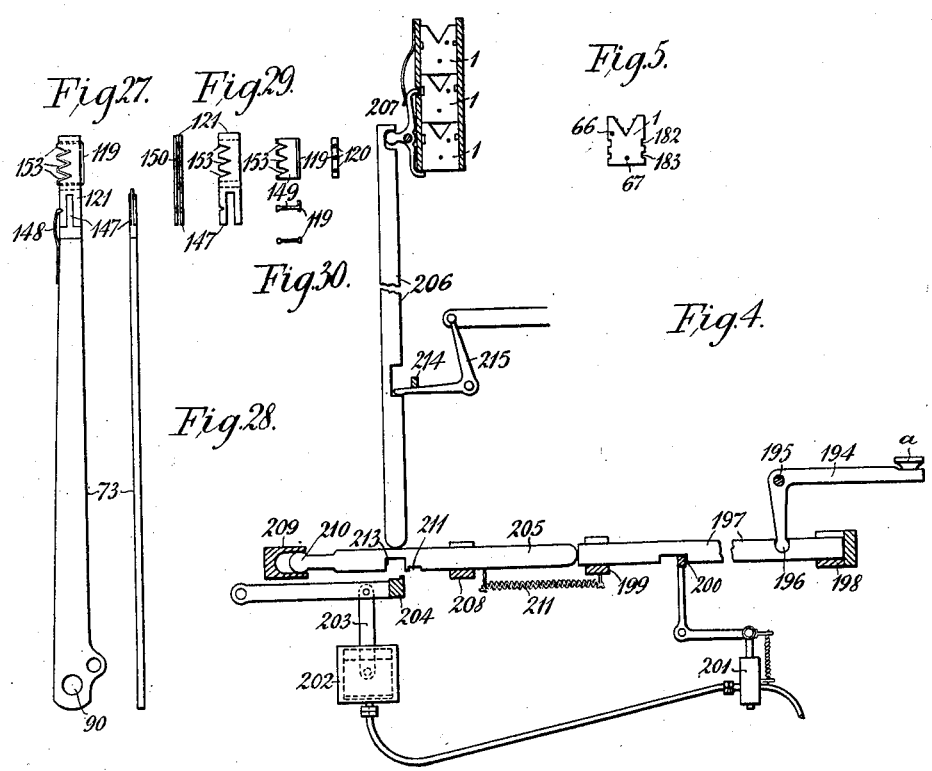

No. 897,358. PATENTED SEPT. 1, 1908.
R. C. ELLIOTT.
TYPE CASTING AND COMPOSING MACHINE.
APPLICATION FILED JUNE 9, 1908.
11 SHEETS—SHEET 7.
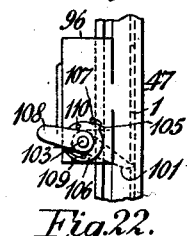
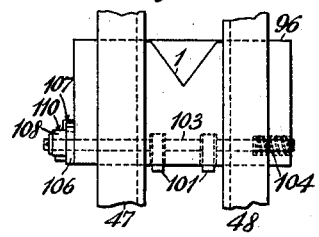
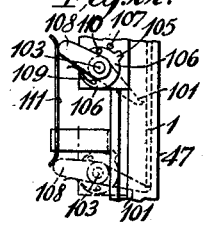
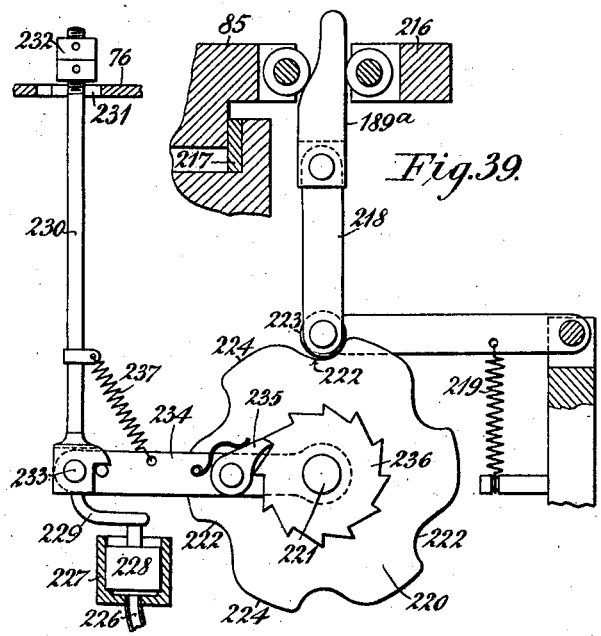
Witnesses.—
Thomas Durant
Paul Bushnell.
Inventor.—
Richard C. Elliott
by J. B. Church
his Atty No. 897,358.  
R. C. ELLIOTT.  
TYPE CASTING AND COMPOSING MACHINE.  
APPLICATION FILED JUNE 9, 1908.
PATENTED SEPT. 1, 1908.
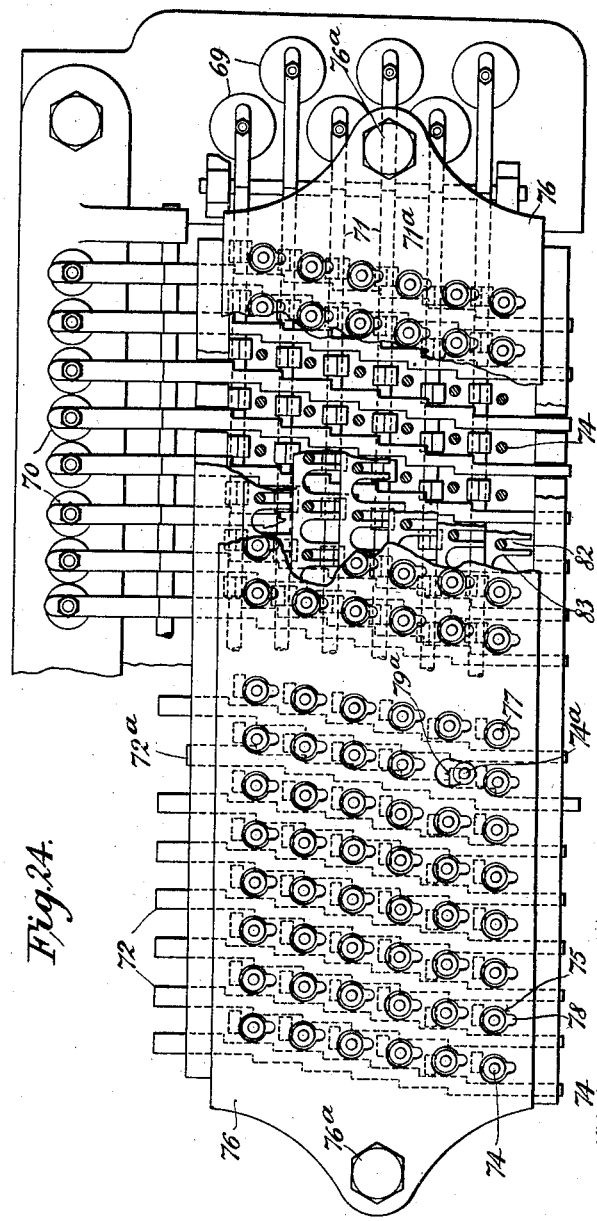
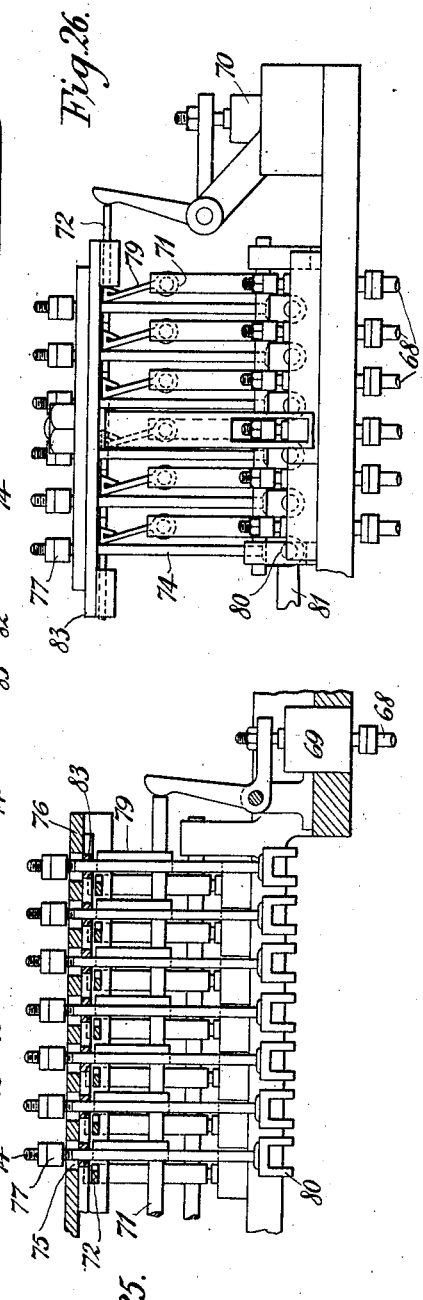

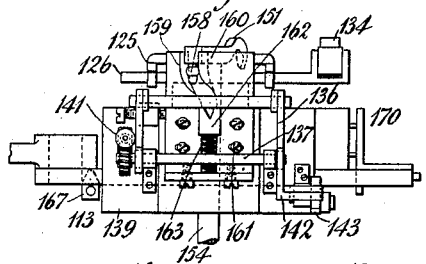

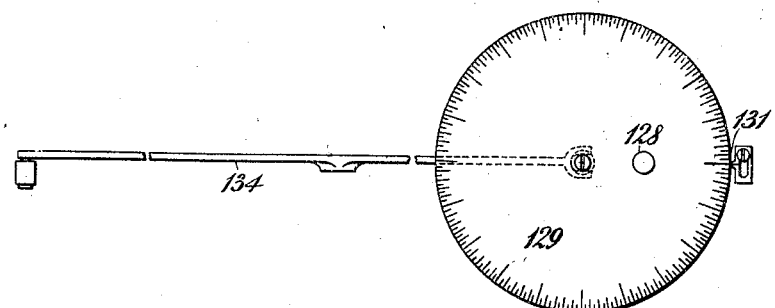
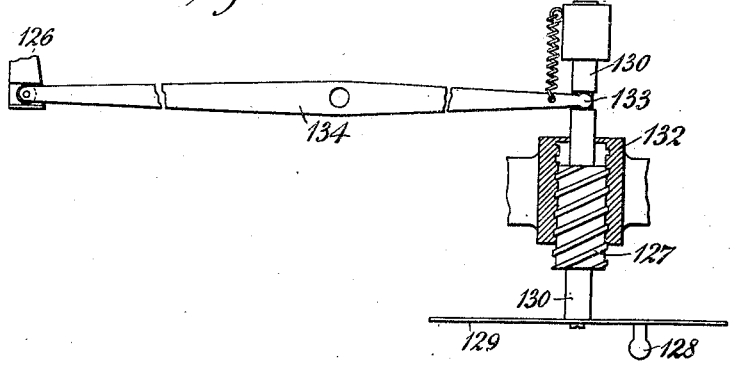

No. 897,358. PATENTED SEPT. 1, 1908.
R. C. ELLIOTT.
TYPE CASTING AND COMPOSING MACHINE.
APPLICATION FILED JUNE 9, 1908.
11 SHEETS—SHEET 11.
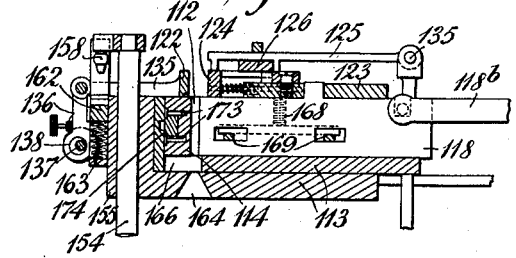
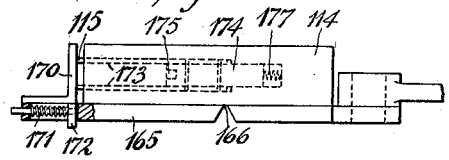
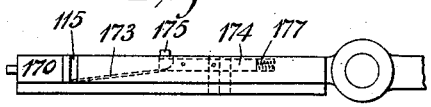
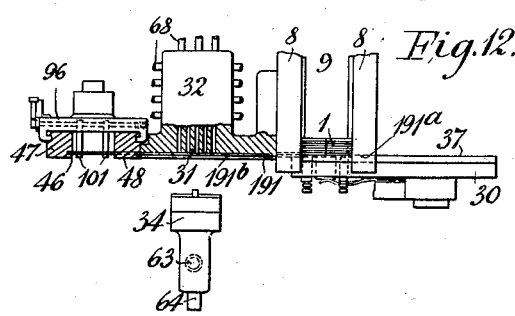
—Witnesses.—
Thomas Durant
Paul Bushnell.
—Inventor:—
Richard C. Elliott,
by J. B. Church
his Atty

UNITED STATES PATENT OFFICE.

RICHARD C. ELLIOTT, OF CLAPHAM, LONDON, ENGLAND, ASSIGNOR TO LANSTON MONOTYPE MACHINE COMPANY, OF PHILADELPHIA, PENNSYLVANIA, A CORPORATION OF VIRGINIA.

TYPE CASTING AND COMPOSING MACHINE.

No. 897,358.    Specification of Letters Patent.    Patented Sept. 1, 1908.

Application filed June 9, 1908. Serial No. 437,601.

*To all whom it may concern:*

Be it known that I, RICHARD CORNELIUS ELLIOTT, a subject of the King of Great Britain, and resident of Clapham, in the county of London, England, have invented a new and useful Improvement in or Relating to Type Casting and Composing Machines, of which the following is a specification.

The object of this invention is to provide a type-casting and composing machine of improved construction, which shall combine the chief advantages, and avoid the most conspicuous of the defects incidental to existing machines whether of the well-known linotype or monotype classes.

In the linotype machine, which requires only a single operator, solid "slugs" (*i. e.*, complete lines) of type are cast, each from a line of matrices selected and assembled, under the control of a key-board operator and mechanically returned to the magazine as each line is cast. The cast lines are ejected into a galley in proper order ready for proofing, but an error can only be rectified by the entire line wherein it occurs being removed bodily, recomposed by means of the key-board mechanism, and re-cast. This class of machine has proved successful in newspaper work wherein the length of line is usually small.

In the monotype machine, which possesses advantages that render it more especially suitable for book and general printing work, lines are cast of individual movable type each of which is capable of correction by hand. The machine comprises two distinct apparatus each requiring a separate attendant, in the first of which key-controlled mechanism is employed to perforate a strip of paper whereby the second or casting apparatus is in turn controlled. In casting, the last line perforated is ejected first, so that the whole length of the paper strip must be passed through the casting apparatus before the first line is ready for proofing. This class of machine involves the use of a separate air compressor or other source of compressed air for working the key-board mechanism, while the apparatus both require supervision by specially skilled men of high intelligence in order that the efficiency of the machine may be maintained unimpaired. Moreover, the employment of a large quantity of paper strip, which is liable to be prejudicially affected by climatic changes, is a source of expense and trouble.

The machine of the present invention is controlled by a single attendant; it requires no paper strip and involves no necessity for the employment of a separate source of compressed air; it casts lines of individually movable type each of which is capable of correction by hand, and each line is conveyed to the galley immediately on being composed. The machine is controlled by key mechanism, but (as a rule) the number of keys need only be about one-third of those employed in the monotype class of machine, while the number of grades of type cast may be about one-third greater. Moreover, type may be produced larger than pica, and the machine may be used to cast fonts of type.

The machine as a whole is designed with a view to securing simplicity, quietness of working, and a construction such that the occurrence of wear in important parts of the mechanism shall not prejudicially affect the perfection or alinement of the type cast.

According to the present invention, key-controlled composing mechanism is first employed to withdraw from a magazine, one by one, a series of what may be termed "selectors" respectively corresponding to the various characters and spaces required to make up a line of type, these selectors being assembled to form a row which, when complete, is withdrawn bodily so as to permit of a fresh line of selectors being composed by the operator. The already complete row of selectors is meanwhile passed to automatic selecting apparatus through the medium of which the several selectors are successively enabled to choose from among a set of die-bars carrying type-matrices those which correspond to the respective characters and spaces. The selectors, after thus performing their function, are automatically returned to the magazine and distributed therein in readiness for reëmployment.

Each die-bar, as selected, is so moved as to bring the type matrix carried by it to casting position, wherein the matrix is clamped securely against an adjustable stationary abutment by an elastic buffer carried by a reciprocating mold-blade, perfect alinement being secured by means of an alining knife of special construction. In this position the selected matrix forms a closure for the upper end of the type mold, wherein casting is effected by squirting the metal into the mold and against the face of the matrix. As each type is cast, it is conveyed to a composing bar wherein all the type required to constitute a line are assembled, the complete line being finally transferred bodily to the galley. It is to be observed that while each line of cast type is perfect, and requires no further justification, any individual type can be as readily removed and replaced as would be the case with ordinary type.

Each die-bar carries a series of matrices exhibiting different faces all corresponding to the same character or unit-value of type, the determination of the particular "face" of type required to be cast (e. g., ordinary Roman, Italic, or black) being effected through the medium of the selectors which, in addition to the function already mentioned, serve to select the particular matrix required from among the series carried by the type-bar. By this means a great saving is effected in the number of selectors required, and consequently also in the number of keys on the composing key-board.

Justification of the line of type is effected during the casting operation, by increasing the space-widths at the moment of casting to the extent required to expand the lines as a whole to a predetermined length. The unit-value of each type, as well as the total unit-value of the line, being known, the difference between the conjoint unit-values of all the type forming the proposed line and the total unit-value of the line itself (as ascertained by the aid of computing and indicating mechanism in substantially the manner adopted in the monotype machine) is compensated for by correspondingly limiting the stroke of the mold-blade already referred to, so as to cause the "set" of each space to be increased beyond its normal or minimum width, this limitation of the buffer stroke of the mold-blade being effected by special mechanism adjusted manually in accordance with the requirements of each separate line but otherwise working automatically.

Improved means are provided for relieving the operator of the greater part of the manual exertion which would otherwise be involved in carrying out the various operations controlled by the composing keys, the relatively light depression of any one of the latter serving to bring into play pneumatic or other power-actuating mechanism whereby the entire cycle of such operations is completed.

Figure 10:
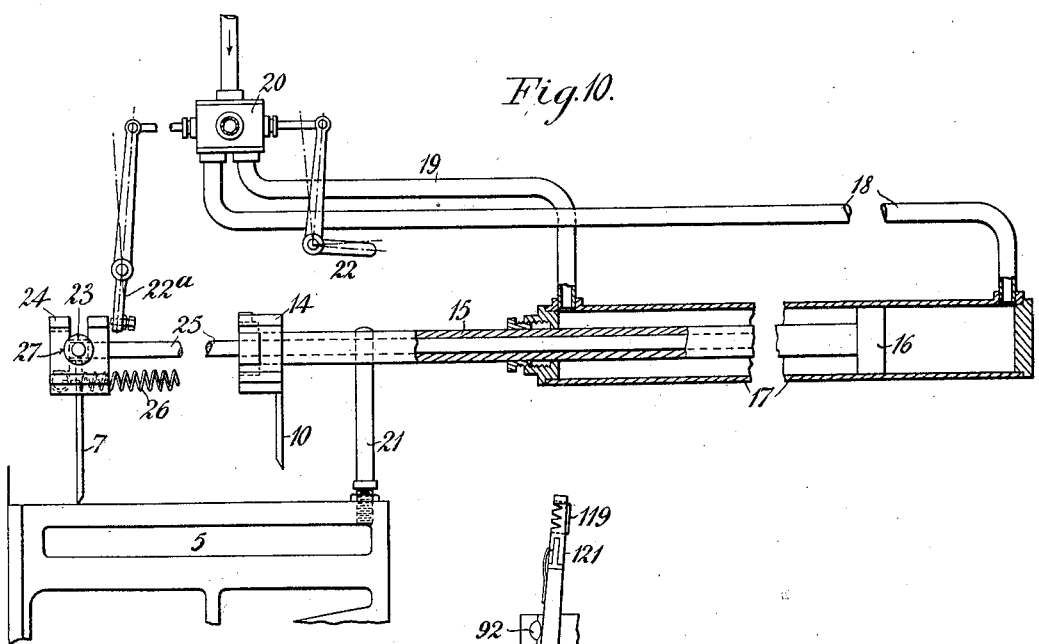
Figure 23:
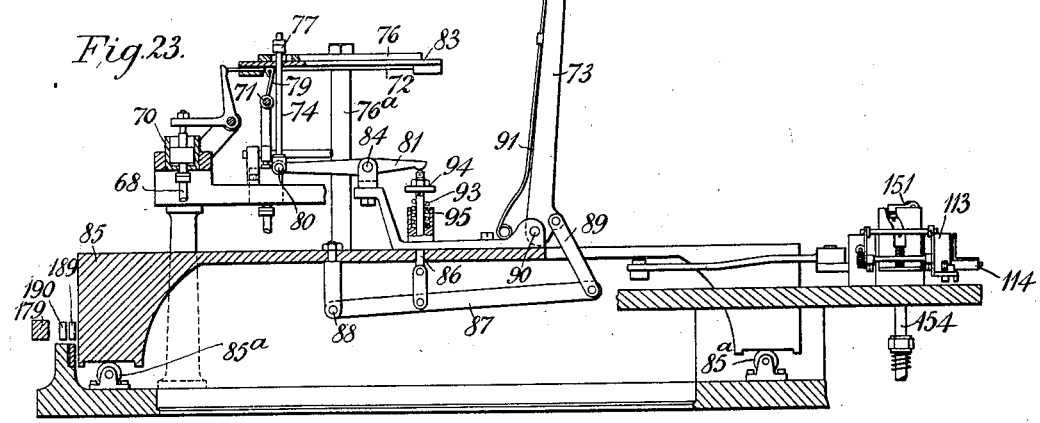

In the accompanying drawings, which illustrate the more essential or characteristic portions of a type-casting and composing machine constructed according to this invention, Figure 1 is a part front elevation and Fig. 2 a part plan of what may be termed the controlling or key-board portion of the machine, while Fig. 3 is a plan view of the type-selecting and casting portion of the machine, these three being only general views, and parts being in each case omitted or broken away for the sake of clearness. Fig. 4 is a side view, partly in section, of the mechanism for operating the selector escapement by a key on the key-board. Fig. 5 is a face view of a selector. Fig. 6 is a front elevation of the assembly and intermediate troughs, parts being broken away, and Fig. 7 is a plan view of the same. Figs. 8 and 9 are sections on lines 8—8 and 9—9 respectively of Fig. 6. Fig. 10 is a front elevation, partly in section, of mechanism for transferring a composed line of selectors from the assembly trough to the intermediate trough. Fig. 11 is an elevation (on a plane at right angles to that of Fig. 6) of the mechanism for transferring the successive selectors from the intermediate trough to operative position, and for subsequently removing them from the latter; parts being in section. Fig. 12 is a part plan view, partly in section, chiefly of those parts shown in Fig. 11. Fig. 13 is an inner or front face view of the pusher whereof the rear is shown in Fig. 11. Figs. 14 and 15 are sections on lines 14—14 and 15—15 respectively of Fig. 11. Fig. 16 is an inner or front face view of the cap of the clamping box and its actuating lever. Fig. 17 is a face view of the clamping box itself, and Fig. 18 is a sectional side elevation showing the clamping box, cap and actuating lever. Figs. 19 to 22 show details of the "Jacob's Ladder" mechanism for returning the selectors to the magazine, Figs. 19 and 20 being portions of the rear or outside elevation similar to that shown in Fig. 11, and Figs. 21 and 22 being side elevations showing a carrier in two different positions. Fig. 23 is a part side elevation, partly in section, of the portion of the machine shown in Fig. 3. Fig. 24 is a part plan view of the lift plate and associated parts, portions being omitted or broken away. Fig. 25 is a part front elevation of the same, partly in section, and Fig. 26 is an end elevation thereof. Fig. 27 is a side elevation of a die-bar shown separately and fitted with die-holders and die. Fig. 28 is an edge view of the die-bar alone. Fig. 29 comprises side and edge views of a die-holder shown separately. Fig. 30 comprises side and face views of a die, together with end views of dies of two different widths. Fig. 31 is a plan view of the casting block. Fig. 32 is a front elevation thereof. Fig. 33 is a section on line 33—33 of Fig. 31; and Fig. 34 is an end elevation of the casting block. Figs. 35 and 36 are respectively plan and face views of the cross slide of the casting block. Fig. 37 is a separate face view of the justification dial and the lever operated thereby, and Fig. 38 is a plan view of the same, partly in section. Fig. 39 shows an alternative arrangement for shifting the die-bar carriage.

Similar reference letters and numerals denote corresponding parts throughout the drawings, and for the sake of clearness the numerals denoting lines of section are distinguished by heavy block characters.

The improved machine comprises two functionally distinct portions, whereof the first, which includes besides the key-controlled composing mechanism, means for determining the extra space required to effect justification, is manipulated directly by the attendant, while the second portion, which includes not only the selecting apparatus but also the actual type casting justifying, and type-setting mechanism, works automatically under the control of the selectors supplied to it from the first portion, both portions being combined in and actuated conjointly as a single self-contained machine, which moreover is capable of producing, as it works, the requisite supply of compressed air if such be used.

The controlling portion of the machine comprises a key-board A and a magazine B controlled by the key-mechanism, the mode of operation of these parts being generally similar to those of the corresponding parts of a linotype machine, while the key-board A is provided with a unit-reckoning device (not shown) as in the monotype machine. The magazine constitutes a font, not of type-matrices as in the linotype machine, but of what have been referred to above as "selectors", each consisting of a flat plate 1 (Fig. 5) adapted to effect the selection of a different character (letter or other sign) in the manner hereafter described, the space or blank selector being similar to a character selector.

The several different kinds of selectors corresponding to the respective characters are of uniform thickness and are stored in the magazine B in upright columns as at $b$ (Fig. 4) each controlled by a separate key $a$, the column $b$ of selectors in the magazine being arranged in groups or otherwise according to the number of units of width occupied by the respective types which the selectors represent. At each actuation of a key $a$ a selector 1 from the corresponding column is caused or permitted to descend through one of the chutes 2 on to an endless traveling band 3 which delivers the selector in front of a pusher 4 constituted by a reciprocating arm whereby the successive selectors are caused to enter an assembly trough 5, as are the matrices in the linotype machine, the series of selectors being packed together in this trough face to face so that the plane of each extends transversely of the length of the box as indicated in Fig. 6. At the same time the unit value of the type represented by each selector thus assembled is registered by the unit-counting device already referred to but not shown. When the row of selectors corresponding to the required line of type has been completed so far as the number of letters and spaces is concerned, the amount of such expansion of the spaces as may be required for justification of the line will be shown upon the indicator drum of the unit-counting mechanism so that, before the assemblage of selectors is disturbed, the justifying mechanism can be properly set. As however, the justifying operation itself does not take place until the moment at which the type-body for each space is actually cast, it will be convenient to defer detailed reference to the justifying mechanism until that of the casting machine is described.

In the assembly trough 5, the selectors are held in close mutual juxtaposition by the forward end of the series contacting with a spring-retracted finger 6 which enters the trough through a longitudinal slot in the bottom of the latter, this finger yielding and traveling forward horizontally as the number of assembled selectors increases. The finger 6 contacts with another spring-retracted finger 7 forming in effect a temporary upward extending continuation of the finger 6, in such manner that the finger 7, which is adapted to move between a pair of stationary lateral guides as at 8, participates in the travel of the finger 6.

The assembly trough 5, which is movable as regards level, having been charged with a row of selectors as above described, is moved by any suitable means to a position opposite the end of a similar but stationary intermediate trough 9 into which the entire assemblage of selectors is thrust bodily by a finger 10, whereupon the assembly trough 5 is returned to normal position to receive a fresh row of selectors corresponding to another line of type, while, by the automatic action of the machine, the selectors are caused to pass one by one out of the trough 9 and, after performing their selective function with reference to the operation of the type-casting mechanism, are returned in succession and by convenient stages to the upper end of the magazine B, where they are distributed to their respective columns of the magazine, in substantially the same manner as are the matrices in the linotype machine.

When the assembly trough 5 is raised to a position opposite the intermediate trough 9 as above mentioned, it carries the assembled selectors upwards out of contact with the finger 6 (which remains always at one level) and into similar contact with the finger 7 which, descending into the trough 5 from above, serves now the same function that was previously fulfilled by the finger 6. Meanwhile the latter, which may be carried by a rod 11 working through a horizontal guide 12, is returned by its spring 13 to initial position in readiness to receive a fresh series of assembled selectors on the descent of the trough 5.

The finger 10 is positively actuated, preferably by pneumatic power as indicated in Fig. 10, wherein it will be seen that this finger is carried by a crosshead 14 on the end of a piston rod 15 reciprocated by means of a piston 16 working in a cylinder 17, to and from the opposite ends of which compressed air is admitted and exhausted alternatively through the pipes 18, 19 controlled by a distributing valve as at 20. Upon the assembly trough 5 being raised to position opposite the intermediate trough 9, a tappet 21 carried by the trough 5 encounters a lever 22 whereby the valve 20 is moved to admit compressed air behind the piston 16, with the result that the latter is caused to advance so that the finger 10 thrusts the entire assemblage of selectors out of the trough 5 and into the trough 9, the pressure being maintained upon the finger 10 so long as any selectors remain in the latter trough.

The forward movement of the assemblage of selectors has for effect to carry forward in front of it the finger 7, which however is automatically removed from its position at the head of the row of selectors immediately before the first of these encounters the pusher whereby the individual selectors are afterwards withdrawn in succession from the trough 9. For this purpose the finger 7 is mounted in an overhead carrier 23 adapted to work perpendicularly in, while moving as one with a crosshead 24 on the end of a rod 25 which is fitted to slide lengthwise through the piston rod 15, the crosshead 24 constantly tending to retreat to initial position under the stress of a spring 26 which may be attached to any convenient abutment (not shown). The carrier 23 is provided with a roller 27 fitted to work in a longitudinal cam-slot 28 in one of the lateral guides 8, while the crosshead 24 (as well as the piston crosshead 14) is fitted to work in a straight horizontal slot 29 in the other guide 8 as indicated. The cam-slot 28 has its forward end upwardly inclined as shown in Fig. 6, so that, as the assemblage of selectors is thrust forward between the fingers 10 and 7 (the former remaining in contact with the last selector of the series) the finger 7 is caused to rise until, by the time the first selector of the series encounters the pusher 30, this finger has been lifted clear of the path of the assemblage of selectors, as indicated by the dot-and-dash lines on the left-hand side of Fig. 6.

When, by the successive removal of all the selectors, the entire assemblage has been dealt with by the pusher 30 as hereafter described, the crosshead 14 encounters a lever 22ᵃ serving to reverse the distributing valve 20, with the result that the piston 16, being retracted, returns the fingers 10 and 7 to initial position in readiness to operate upon a fresh assemblage of selectors.

At the same time as the assembly trough 5 is brought into alinement with the intermediate trough 9, the unit-reckoning mechanism (in connection with the key-board) is returned to zero position, and a trip is released so as to cause or permit a complete line of cast type to be ejected into the galley. In the case however of tabular work, for example, the ejection of the line into the galley may be delayed until all the columns represented in the line, have been completed.

As soon as the assemblage of selectors has been deposited in the intermediate trough 9, each selector in succession is removed therefrom by the action of the pusher 30, which reciprocates (at the farther or front end of the trough) horizontally in a direction perpendicular to that of the length of the trough, the assemblage of selectors being meanwhile continuously thrust, by the pressure of the finger 10, towards that end of the trough at which the pusher operates so that the movement whereby successive selectors are caused to slide out of the trough occurs always in one and the same plane, with which plane that of each selector has first been caused to coincide. By this movement each selector in succession is brought into position opposite the face 31 of what may be termed a "clamping-box" 32 against which the selector is pressed by the face 33 of a cap 34, the selector being thus caused to make an airtight joint with both the cap 34 and the clamping box 32 so as to be enabled to fulfil its proper function which will be described hereafter with special reference to the preferred arrangement of this part of the mechanism.

The pusher 30 (Figs. 11 to 15) consists preferably of a block fitted to slide in upper and lower horizontal guides 35, 36 extending transversely of the forward end of the trough 9, the rear (and larger) portion 37 of the active face of the block being in one plane so as to be adapted to slide in contact with the surface bounding or constituting in effect the end of the trough. At its forward end, the face of the pusher has a recess 38 of a form and depth adapted to receive a single selector 1, so that, each time the pusher is fully retracted as in Figs. 11 and 12, the selector which happens to be at the forward end of the series assembled in the trough 9 will be enabled to enter this recess under the pressure of the finger 10. Upon the pusher thereupon making its forward stroke, the shoulder constituted by the rear end edge 39 of the recess 38 will catch this selector, which will consequently be carried by the pusher to, and left by it in, a position exactly opposite the face 31 of the clamping box 32, as indicated at 1ᵃ in Fig. 11, the withdrawal of the selector, owing to its frictional contact with the pusher during the return stroke of the latter, being prevented by means of a spring detent 40.

The to-and-fro movement of the pusher may be produced by means of a suitably actuated lever 41 fulcrumed as at 42 and having a pin-and-slot or equivalent connection as at 43 with the back of the pusher. As the motion communicated by the pusher to the successive selectors is sudden, it is necessary to prevent each successive selector from overshooting its proper position $1^a$ relatively to the face of the clamping box.

A convenient and simple means for insuring this is shown in Figs. 11 and 12. It has already been stated that after each selector has performed its proper function, it is withdrawn from operative position and caused to return to the magazine B. For this purpose each fresh selector brought by means of the pusher 30 from the trough to operative position $1^a$ is caused to displace therefrom the immediately preceding selector, which is thus thrust along the upper and lower guides 44, 45 upon which the selectors pass across the face 31 of the clamping box, a series of such displaced selectors, juxtaposed in one plane, extending from the operative position $1^a$ to the "removal" position $1^b$ at which their progress is positively stopped by the selector which for the time being is in removal position encountering the stop 46 constituted by the lower portion of the corresponding one of the lateral guides 47, 48 of the "Jacob's Ladder" hereafter described. Since at each return or idle stroke of the pusher 30, the selector immediately before left in the removal position $1^b$ at the foot of the "Jacob's Ladder" is caused to ascend the latter, it will be obvious that the subsequent advance of a fresh selector from the trough 9 to the operative position $1^a$ will be rendered possible, but such advance will be definitely checked at the proper instant by the arrest of a displaced selector in the removal position $1^b$.

The face 31 of the clamping box 32 presents a series of orifices 49, and the face 33 of the cap 34 presents a corresponding series of orifices 50. The orifices 50 are in two sets leading respectively from separate chambers 51 and 52 provided in the cap 34 and supplied in succession with compressed air when that selector which for the time being is in the operative position $1^a$ is held, by the pressure of the cap, against the face of the clamping box. For this purpose the cap 34 is pivotally mounted as at 53 on one end of an arm 54 whose other end is pivoted as at 55 to turn about the fulcrum of a lever 56 reciprocated in time with the lever 41, as for example by means of a link 57. This lever 56 has an extension 58 which, when the cap 34 (guided by dowel pins 59) has initially clamped the selector against the face of the clamping box, continues its movement and, by compressing a buffer spring 60 interposed between it and the back of the cap, insures an air-tight joint between the operative faces of the selector and the faces 31 and 33 of the clamping box and cap respectively.

The chambers 51 and 52 are supplied with air through passages 61 and 62 from a supply pipe 63 under the control of a piston valve 64 carried by the cap and normally held by a spring 65 in position to close both passages. When (after the initial clamping of the selector) by the continued movement of the lever-extension 58 the buffer spring 60 is compressed, the end of the lever-extension encounters and forces in the valve 64 against the pressure of the spring 65 and thus admits compressed air by the passages 61 and 62 to the chambers 51 and 52 in succession.

Each selector 1 is pierced with two holes (as at 66 and 67, Fig. 5) respectively adapted to register with one of the orifices in each of the sets in the clamping box and cap corresponding to the chambers 51 and 52, the relative arrangement of these holes differing in the selectors corresponding to the respective types, so that all the types which the machine is capable of producing are represented by different combinations of two from among two sets of orifices each comprising but a few members.

The orifices 49 of the clamping box 32 communicate, by means of separate air-ducts 68, with as many pneumatic power-cylinders which are arranged in two sets 69 and 70 (Figs. 24 to 26) respectively corresponding to the orifices 50 of the two chambers 51 and 52 of the cap 34, so that when the valve 64 is opened by the lever extension 58, air will pass through the holes 66 and 67 of the selector to one cylinder of each of the sets 69 and 70. In these cylinders work pistons which are connected with and serve (when actuated) to displace lengthwise against the pressure of springs (not shown) selector-bars likewise arranged in two sets 71 and 72, longitudinally and transverse, crossing one another horizontally at right angles and respectively corresponding to (what may be regarded as) the two sets of air ducts, so that the various possible combinations of selector bars correspond to the combinations of holes in the selectors and therefore to the respective types producible by the machine. The number of such possible combinations of selector-bars 71, 72 is equal to the number of die-bars 73 (Figs. 3 and 23) carrying type-matrices for use in casting, and means are provided whereby, as each successive selector performs its function of selecting one particular combination of selector-bars appertaining to the two sets, the corresponding die-bar will be brought into operation so as to enable the casting of the corresponding type to be effected whether the latter be a character or a space. For this purpose each die-bar 73 is actuated, through suitable lever mechanism, by a separate catch-rod 74, the several catch-rods projecting through holes 75 in what may be termed a lift-plate 76 and being provided each with a shoulder 77 adapted to engage the lift-plate when the catch-rod is canted laterally. The catch-rods are arranged in longitudinal and transverse rows corresponding respectively to the two sets of selector bars 71 and 72 so that when (say) a longitudinal selector-bar (such as 71ª) has first been displaced to select the corresponding longitudinal row of catch-rods, the subsequent displacement of a transverse selector-bar (such as 72ª) will cause the catch-rod 74ª of the row to be canted which is situated at the crossing point of the two bars.

The lift plate 76 is carried by plungers 76ª whereby it is bodily reciprocated parallel to itself once for each cycle of operations of the casting mechanism, i. e., once each time a selector is brought into position against the face of the clamping box 32, with the result that (although normally the reciprocations of the lift-plate would leave the catch-rods unaffected) the plungers 76ª carrying lift plate 76 may be operated manually or through suitable driving connections properly timed to raise the lift-plate after the selector has been clamped in the clamping box, and the designated selector bars actuated, so that the catch rod 74 located at the intersection of said selector bars and tilted thereby will be engaged and lifted, to cause the type matrix corresponding therewith to be seated upon the mold and be thus retained until after the alining knife, hereinafter referred to, has been brought down upon the rear face of the matrix, after which the lift-plate 76 is retracted preparatory to the selection of the next succeeding matrix. The particular catch-rod 74ª which has been canted by the conjoint action of the two selector bars 71ª, 72ª will be caught in consequence of the engagement of the shoulder 77 with the lift plate and will be moved (in the direction of its own length) along with said plate, thus causing the corresponding die-bar 73 to be brought to operative position.

The shoulder 77 on each catch-rod may be constituted by a nut and lock-out screwing adjustably upon the rod 74 so as to enable the throw of the die-bar 73 to be regulated as required, the hole 75 in the lift-plate being of key-hole shape normally permitting the nut 77 to pass through it without engagement, but being formed at one part of its circumference with a notch 78 which, although adapted to receive the catch-rod itself when the latter is canted, will not give passage to the nut. Each catch-rod may be canted by means of a separate push-piece 79, the push-pieces being in the form of radius arms movable with, but adapted also to turn about, the longitudinal section-bars 71, and so mounted on said bars as to be in effect arranged in longitudinal and transverse rows like the catch-rods. The push-pieces 79 are thus capable of movement in two directions corresponding to the displacements of the respective sets 71 and 72 of selector-bars, so that only that push-piece 79ª of a transverse row will be moved by the displacement of the corresponding transverse selector-bars 72ª, which is also in the longitudinal row carried by the longitudinal selector-bar 71ª just previously displaced. Each longitudinal selector bar 71, when displaced, causes the movement of all the push-pieces 79 of the corresponding row in one direction, while each transverse selector bar 72 is stepped as indicated, or provided with pins or equivalent means such that, when displaced, the bar will engage and move only that push-piece in its own transverse row which is also in the longitudinal row already moved by the displacement of a longitudinal selector-bar.

If it is desired to repeat a character (as for example in casting a font) the corresponding selector may be permanently held in operative position relatively to the clamping box 32 or the die-bar catch-rod 74 permanently engaged with the lift-plate 76, the casting apparatus being allowed to work continuously until the desired number of types has been produced.

Each catch-rod 74 is pivoted at 80 to a separate lever 81 and is guided in a slot 82 in a plate 83 (Fig. 24) so as to be movable only in the direction of the depth of the notch 78. The lever 81 is fulcrumed at 84 to the carriage 85 (Fig. 23) supporting the entire series of die-bars 23, and actuates the particular die-bar to which it appertains by depressing a push-rod 86 so as to actuate a lever 87 fulcrumed at 88 to the carriage and coupled by a link 89 to the die-bar. The latter is pivoted to the carriage 85 at 90, a spring 91 serving to normally retain the die-bar retracted against a cushioned stop-bar 92 and to return to the inoperative position, after use, the various parts (including the catch-rod 74) directly connected to the die-bar. The descent of the push-rod 86 is cushioned by a spring 93 and limited by an adjustable collar 94 adapted to encounter a stop 95 so that any tendency on the part of the die to "slam" down on the mold may be overcome.

Having thus described how each selector which has passed through the troughs 5 and 9 performs its function of selecting from among the series of die-bars 73, that one which carries the type-matrix corresponding to the type which was chosen by the operator when he struck a key $a$ on the keyboard A, and how this die-bar is moved so as to bring the matrix carried thereby down upon the mold, it will be well (before proceeding to describe the mold itself and the casting operation) to explain the action of the

"Jacob's Ladder" already referred to whereby each successive selector, having finished its work and been passed from the operative position 1ª to the removal position 1ᵇ (Fig. 11) is returned to the distributing apparatus by which the various selectors are sorted out and replaced in the magazine B.

At each forward stroke of the lever 41 and pusher 30, a slide 96 (Figs. 11, 19 and 21) which may be actuated through a link 97 coupled to a lever 98 fulcrumed at 99 and operated through a pin-and-slot or equivalent connection as at 100 from the lever 41, is caused to descend along the lateral guides 47, 48 of the "Jacob's Ladder" to a position opposite to that selector which then occupies the removal position 1ᵇ (Fig. 11). When in this lowest position, a pair of pawls 101, carried by the slide 96, engage beneath the selector and, when the slide rises during the return stroke of the lever 41 and pusher 30, lift the selector along with the slide until, just before the latter reaches its highest position, a pair of spring detents 102 mounted on the guides 47, 48, are enabled to engage beneath the corners of the selector and retain the latter when the slide 96 and pawls 101 again descend. A series of such slides are adapted to move in time with the lowest slide 96 (alone shown on the drawings) and are similarly adapted to raise each selector step by step from one pair of spring detents 102 to another in succession, until, on reaching the level of the top of the magazine B, the selectors are pin-pushed on to guide-rails along which they are traversed by a screw-conveyer and delivered to distributing apparatus of any convenient kind (such as is well-known in connection with the return of the matrices to the magazine in the linotype class of machine) whereby the various selectors are returned to their proper columns b (Fig. 4) in the magazine. In this connection it may be observed that the reason for the employment of a series of slides 96 and detents 102, instead of a single set, is to raise the selectors to the level of the guide rails, the parts being duplicated and so arranged that one slide 96 will take the selector deposited by the next lower slide upon the detents 102 associated therewith and advance it to the detents associated with the first named slide in position to be in turn engaged by the slide next above. Each selector is furnished with appropriate distributing teeth within the V-shaped recess in its upper edge after the manner of linotype matrices as indicated in Fig. 5.

The pawls 101 of each slide 96 are fast on a horizontal spindle 103 mounted to rotate in bearings in the slide 96 and constantly tending, under the stress of a spring 104, to turn so as to bring the pawls to (or retain them in) the operative position shown in Fig. 21 and in dot-and-dash lines at the lower part of Fig. 22, the rotation of the spindle 103 in this direction being limited by a projection 105 on a disk 106, fast on the spindle, encountering a stop 107 on the slide. As the slide 96 descends to pick up a selector, the pawls 101, which would otherwise strike or foul the latter, are caused to turn downwards against the stress of the spring 104, by means of an arm 108 which is pivoted loosely on the spindle 103 and is consequently pressed by a spring 109 in a direction opposite to that in which the spring 104 acts, the arm 108 engaging the disk 106 by means of a pin 110 fixed on the disk. During the descent of the slide 96 and just before the pawls 101 reach the level of the top of the selector, the arm 108 encounters a stationary cam 111 whereby it is caused to turn so as to rotate the spindle in the direction to depress the pawls, this cam however permitting the arm 108, and therefore the pawls 101, to return to normal position as soon as the latter have passed beneath the level of the bottom of the selector, as indicated in Fig. 22.

The types are cast in a mold 112 (Fig. 31) constituted by a portion of a groove formed in a block or frame 113 which carries nearly all the working parts most intimately concerned in the casting operation, so that what may be termed the casting mechanism (apart from the pumping apparatus whereby the molten type-metal is supplied and which, being of any known or convenient construction, is not illustrated in the drawings) is virtually self-contained and may, when repairs are necessary be quickly removed from the machine as a single piece and replaced by a duplicate set of the same mechanism.

The casting groove (whereof the mold proper 112 forms a part as stated) is of constant width and depth, corresponding to the "body" and height of the type to be cast, its effective length being variable to suit the "set" of types of different unit-values. The position of one end of the casting groove is constant, this end being normally closed by a carrier-block or cross-slide 114 which reciprocates transversely of the casting groove and is provided with a corresponding carrier groove 115 adapted to receive the cast type as the latter is ejected from casting position and convey it to a point opposite a stationary channel 116 leading to the composing bar and galley 117 (Fig. 3), the necessary mechanism being provided for imparting the requisite movements to the cross-slide 114 and also to the cast type at each stage of progress of the latter.

The variable end of the casting groove is bounded by the extremity of a mold-blade 118 which, just before each casting operation, is advanced along the casting groove towards the carrier-block 114 until the requisite distance from the latter (corresponding to the "set" of the type to be cast) is attained.

This distance is determined by the width of the die 119 which has just before been brought into operative position by one of the die-bars 73 as already described. The die 119 bears on its face one or more preferably a plurality of matrices 120 (Fig. 30) and is itself carried by the die-bar (preferably through the medium of a separate holder of corresponding width such as 121 (Figs. 27 and 29), the advance of the mold-blade 118 being arrested by encountering the die 119 (or its holder 121) which, when brought to casting position, is prevented from becoming displaced under the thrust of the mold-blade by being itself then backed up by a stationary abutment 122. The die 119 is slidable to a slight extent lengthwise of its holder 121 for a purpose to be hereafter explained, and in order to lessen wear-and-tear upon the die or die-holder and prevent the fit of the die upon the bar being prejudicially affected by the otherwise dead blow of the mold-blade 118 against the die (the latter being as just stated backed up by an unyielding abutment), the mold blade encounters the die not directly but through the medium of a sizing slide 123 carrying a spring buffer 124 whereby the blow is cushioned without the distance actually traveled by the mold-blade being affected.

When in casting position die 119 is clamped between abutment 122 and spring buffer 124 with one of its matrix cavities opposite the open end of the casting groove in the mold where it is held by an alining knife adapted to engage a groove in the back of the die and press the latter upon the mold until after the cast has been made.

As the mold-blade receives its motion from the cam-shaft of the machine (not shown) through lever mechanism having a uniform amplitude of stroke, it is obvious that some member of this mechanism, such as the push rod 118$^a$ (Fig. 3.) must act through a buffer-spring of properly adjusted strength.

118$^b$ indicates a coupling whereby the push-rod may be readily disconnected from the mold-blade 118 when the casting block 113 requires removal.

When a space body is to be cast, the increased thickness required to effect justification results from the arrest of the sizing-slide 123, and therefore also of the mold-blade 118, at a point of its travel earlier than would be due to the normal or minimum thickness of the space-die itself. In order to bring about such earlier arrest of the mold-blade, the space die-bar or holder is arranged to engage an elongated arm 125$^a$ of, and so move, a grid 125 serving as the support and guide to a wedge 126 and thus cause the latter to be interposed between the sizing-slide 123 and spring-buffer 124, the position to which the wedge 126 has been already advanced longitudinally (as hereafter described) and the effective width of wedge thus interposed, determining the point in its travel at which the advance of the mold-blade 118 is arrested. That is to say, the wedge 126 (previously adjusted in accordance with the justification required) having been brought to operative position by the movement of the space die-bar, the subsequent advance of the mold-blade 118 carries forward the sizing-blade 123 which, meeting the now interposed wedge 126, thrusts this against the spring buffer 124, and the buffer against the die 119, until the latter, encountering the stationary abutment 122 as before, ultimately stops the movement of the various parts.

The so-called grid 125 constitutes a movable support for wedge 126 by means of which the latter is held out of engagement with the mold-blade adjusting devices while character type are being produced and is moved into engagement therewith when justifying space type are called for. To this end the grid or rigid frame 125 is pivotally supported, as at 135, in rear of the mold, and is provided at its outer or free end or edge with a projecting portion 125$^a$, in position to be engaged by the space die-bar or holder.

By reference to Fig. 3 it will be seen that the die-bars are pivotally supported on the side of the grid opposite projection 125$^a$, so that the die bars equipped with character matrices shorter than the space die bar or holder are free to pass said projection without engaging the latter, whereas the space die bar or holder will contact with said projection and depress the grid.

During the presentation of character matrices to the mold the grid is sustained in elevated position, to support the wedge above or to one side of the plane of movement of spring buffer 124 and of a bearing 123$^a$, pivotally attached to and borne by sizing blade 123 (Figs. 3, 31, and 32); but when a space die-bar or holder is brought down upon the mold it engages projection 125$^a$, and swings the grid down until the wedge enters the space between the rear edge of spring buffer 124 and bearing 123$^a$ of the sizing blade.

The adjustment of the wedge 126 is manually effected immediately after the row of selectors corresponding with the line of type has been assembled in the trough 5 as already described, the amount of space-expansion required for justification being then indicated by the unit-reckoning mechanism previously mentioned. The movement of the wedge is produced by means of a screw 127 (Fig. 38.) connected to the wedge and rotated by a crank-handle 128 presented (as indicated in Figs. 1 and 2) in convenient proximity to the composing keyboard A, this handle being rotated, for each line of type, through an angle corresponding to the required advance (from zero) of the wedge as indicated on a circular dial 129 fast on the spindle 130 of the screw 127 and rotatable relatively to a stationary index 131. The screw 127, which works through a fixed nut 132, engages by shoulders on its spindle 130 as at 133 with one end of a lever 134 whose other end engages the wedge 126, the arrangement being such that the indication given by the unit-reckoning mechanism may be transferred directly to the dial 129 and thence to the wedge 126 by means of the crank handle 128, no calculation being necessary. When the space die-bar returns (after the casting operation) to normal position, the grid 125, which is pivoted as at 135×, is set free, and is returned by a spring (not shown) to inoperative position, thus withdrawing the wedge 126 from between the slide 123 and buffer 124.

In order to obviate the production of hair lines in the print, due to the presence of upstanding burs of type metal on the shoulder adjacent the letters, each die 119 is made wider than the matrix 120 (Fig. 30) carried on its face, and therefore also correspondingly wider than the interval which is left, at the moment of casting, between the extremity of the mold-blade 118 and the face of the cross-slide 114 and which determines the "set" of the type in other words the face of the die surrounding the matrix cavity overlaps and covers the end of the mold cavity. Such extra width of the die is allowed for, on the one hand by a corresponding adjustment of the position of the stationary abutment 122 against which the die is clamped by the spring buffer 124, and on the other hand by the position of the sizing-slide 123 relatively to the mold blade 118.

The adjustment of the position of the stationary abutment 122 for the die is further adapted to enable such allowance to be made in the thickness or "set" of all the types of a line or lines as may be necessary in order to compensate, for e. g. the result of variations in the temperature of the molten type-metal, or of the casting mechanism, or other causes. The means whereby this adjustment is effected serves also, preferably, to slightly retract the stationary abutment 122 from operative position immediately before the bringing of each die 119 to casting position, so as to prevent the possibility of the die in its descent striking and fouling the abutment, the latter being afterwards caused to advance to operative position in time to receive the impact transmitted to it through the die from the mold-blade 118 and spring-buffer 124. For this purpose the abutment 122 forms part of a frame 135 slidable over the casting block 113 and cross-slide 114 and pivotally connected to a lever or levers 136 fast on a rock shaft 137 carrying eccentrics as at 138 through which the shaft is supported in bearings on the casting block 113. On one end of the shaft 137 is a worm wheel as at 139 in gear with a worm 140 which may be rotated by a milled head 141, so that by turning the latter, the effective position of the abutment 122 at the termination of each forward oscillation of the rock-shaft 137 may be adjusted as required.

The shaft 137 constantly tends, under the stress of a spring (not shown) to turn so as to retract the abutment 122 from operative position, and is caused to rock in time with the reciprocations of the mold-blade 118 (which again is timed in accordance with the movements of the various die-bars 73) so as to bring the abutment 122 to operative position, by the engagement, with an arm 142, on one of the levers 136, of a cam 143. The latter is coupled by a link 144 to a lever 145 pivoted as at 146 to the casting block 113, this lever being struck at each backward movement of the mold-blade 118 (or some part moving as one therewith) with the result that the cam 143 is rotated against the stress of a spring (not shown), so as to permit the abutment 122 to be retracted by its own spring. On the forward movement of the mold-blade 118 commencing, the cam is rotated by its spring in the reverse direction, and thus causes the arm 142 to turn the shaft 137 and restore the abutment 122 to the predetermined operative position as adjusted by means of the eccentric 138.

The die-holder 121 on each die-bar 73, when used, is preferably socketed on the bar as indicated at 147, in Figs. 27 to 29, and retained in position by a spring catch 148 so as to be readily removable when required. As already stated, each die 119 carrying a type-matrix 120 is made slidable to a slight extent lengthwise of its holder 121, this being done in order to enable the matrix to be alined automatically before casting takes place. The die 119 may for this purpose be constituted by a flange (see Fig. 30) on the front edge of a plate 149 adapted to fit laterally, but also to slide to a small extent longitudinally, in a socket 150 provided in the holder 121, the plate 149 extending clear through the depth of the socket as indicated. Alinement is effected by means of an alining knife 151 having a wedge-shaped blade (or point) 152 which, as soon as the mold blade 118 has advanced to give the correct thickness of letter, is caused to engage in a V-shaped notch 153 on the back of the die and its holder, the knife being positively guided and moved so as at once to determine the position of the die and matrix, and to force these home into casting position relatively to the mouth of the mold 112, the slight looseness of the die 119 upon the die-bar 73 permitting of the necessary movements being performed.

The alining knife, when not in use, is swung out of the way, and at the proper moment is brought by cam mechanism directly over the die 119, its subsequent motion being so controlled that the possibility of shake or displacement is eliminated and perfect alinement of the matrix is insured. For this purpose the knife 151 may consist of an arm fast on a spindle 154 fitted to slide vertically in a guide 155 on the casting block 113, the spindle being depressed at the proper moment by means of a lever 156 having an excess movement absorbed by a spring 157. The arm 151 constituting the knife has a rearward extension 158 which engages in a cam grooove 159 provided in a bracket 160 adjustably fixed as at 161 on the casting-block 113, the form of this groove being such that as the knife descends it will be guided accurately to operative position and, as it rises, it will be moved out of the way of the next descending die bar 73. As the knife extension 158 descends in the cam-groove 159, it encounters and makes a wedge-like fit in a block 162 adapted to slide in the vertically straight lowest portion of the groove and supported therein by a buffer-spring 163, the downward blow of the knife being thus cushioned and all "shake" in its movement being at the same time eliminated.

The nozzle of the pump (not shown) whereby the molten type-metal is injected from beneath into the mold 112, fits in a conical aperture 164 in the bottom of the casting block 113 directly beneath the mold, the bottom 165 of the cross-slide 114 being formed by a flange which extends laterally beneath the mold so as to reciprocate over and in contact with the upper end of this aperture in order that at each backward stroke of the slide 114, the metal then carried by the latter may be severed from that in the pump-nozzle. The metal passes from the nozzle to the mold 112 by way of a transverse notch 166 of inverted V-shape provided in the flange 165, so that simultaneously with the severance of the metal in the pump-nozzle from that carried by the cross-slide 114, this latter body of metal (known as the "tang") is also shorn off from the type cast in the mold, the type being thus accurately trimmed to the proper height. The tang is carried back with the cross-slide 114 as the latter retreats, until, when the carrier-groove 115 is brought opposite the mold 112, the notch 166 containing the tang is clear of the rear side of the casting block 112. At this moment an extruder 167, suitably actuated, is caused to advance and push the tang out of its notch, the metal of tang being allowed to return by a chute (not shown) to the melting pot or other receptacle.

The mold-blade 118, which is spring-held in position in the casting groove as indicated at 168, 169 (Fig. 33) has what may be termed a double stroke, that is to say, for each type molded the mold-blade receives first a forward movement limited by the die as already described so as to co-act with the cross-slide 114 and the walls of the casting groove in forming the mold 112, and, after the type has been cast the mold blade receives a further forward movement sufficient to cause the type to be extruded from the mold into the carrier-groove 115 when, by the retraction of the cross-slide 114, said groove has been brought opposite the mold.

The outer wall of the carrier-groove is constituted by a movable bracket 170 fitted to work to-and-fro lengthwise of the cross-slide and normally (i. e. when the groove is empty) held by a spring 171 in position to render the groove slightly narrower than the type. Just before the groove (during the backward stroke of the cross-slide) arrives opposite the mold 112, a tappet 172, carried by the bracket 170 and working in a slot (not shown) in the base of the casting-block 113, encounters the end of said slot and, by arresting the bracket while the slide 114 finishes its stroke, causes the carrier-groove 115 to become slightly wider than the type. Consequently the latter is enabled to easily enter the carrier-groove and, during the subsequent forward stroke of the cross-slide, becomes securely clamped in the groove by the spring 171 tending to again narrow the groove.

The carrier-groove 115 extends completely across the cross-slide 114 which is of a width greater than the "set" of the widest type cast by the machine. Consequently there is a risk, when the carrier-groove is widened as just described to receive the type on its extrusion from the mold 112, that the type might fall over transversely of the cross-slide. To obviate this, spring fingers 173, carried by the cross-slide, normally project across the carrier-groove 115 close to the end thereof next the mold so as to receive and support the type on its entrance into the groove, the fingers 173 yielding transversely of the cross-slide so as to accommodate type of all widths. The bracket 170 may be notched or grooved to give passage to these fingers when in their normal position.

The spring fingers 173 are mounted on a block 174 carried by and fitted to slide lengthwise of the cross-slide 114, and just before the carrier-groove 115 is brought (by the forward stroke of the cross-slide) opposite to the channel 116 leading to the composing bar and galley 117 (Fig. 3) a lug 175, which projects from the block 174 and works in a slot 176 in the adjacent surface of the casting block 113, encounters the end of this slot and, by arresting the block 174, causes the fingers 173 to be retracted in opposition to the stress of a spring 177, so as to allow the type to be extruded by a pusher 178 in front of the composing bar 117$^a$. As the cross-slide 114 commences its backward stroke, the pressure of the spring 177 is permitted to return the fingers 173 to the normal or operative position shown in the drawings.

Thus far this description has contemplated only the operations incidental to the casting of type of a single "face", but it is evident that, in practice, provision must be made for casting with the same machine type of different faces (such for example as ordinary Roman, italic, and black-faced) such as may be required side by side for the printing of any single line of letter-press. To enable this to be done, each die 119 is furnished with a series of matrices 120 (in the example illustrated, three) respectively corresponding to the different "faces" of type required, and means are provided whereby (without any increase in number of keys on the key-board A) the particular matrix required is selected by the same selector which selects the character to be cast.

The bar 73 which carries each die 119 is of such form that when moved to the operative position it presents the die carried by it so that the matrices 120 extend in a row across the casting groove in the direction of the "body" of the type (that is to say at right angles to the length of the line of which the individual type to be cast will form a part) the selection of the particular matrix to be used being determined by suitably adjusting the position of the die-bar, and therefore of the die and its series of matrices, in the direction in which the series of matrices extends. This adjustment is effected by moving, in the same direction and to the requisite extent, the carriage 85 (which is supported on rollers 85ª) together with the entire assemblage of die-bars 73 immediately before the selection of the particular die-bar takes place, so that when a die-bar is brought to operative position the required matrix will be presented in casting position over the mold. To enable this to be done, each selector may be adapted, when so required, to bring into action a pusher 179 (Figs. 3 and 23) which normally is inoperative as regards the carriage, the level of the individual selector, relatively to the normal level of the row of selectors in the assembly trough 5 and intermediate trough 9, being utilized to determine the effective length of the stroke of said pusher and therefore the amount of displacement (if any) given to the carriage 85 immediately before the selected die-bar 73 is moved. For this purpose each selector is adapted to fit and slide in the assembly trough 5 and intermediate trough 9 in any one of as many different positions, as regards level, as there are faces of type provided, the particular level at which a selector is to enter the assembly trough being determined by the operator adjusting (by means of a shift handle 180 and cam 181 Figs. 6 and 7) the level of the trough 5 relatively to the mouth of the chute 4ª (through which the selectors are delivered from the magazine by the pusher 4 previously mentioned) immediately before the selector is withdrawn from the magazine.

Preferably the sides of each selector are notched, as at 182 and 183 Fig. 5, to fit and slide at corresponding levels upon a pair (or pairs) of ledges 184 Figs. 6 and 9 extending parallel to one another throughout the length of the troughs 5 and 9 and adapted, alternatively, to support the selectors either at the lowest level by engaging in the upper notches 182, or at an intermediate level engaging in the lower notches 183, or at the highest level by engaging beneath the bottom edge of the selectors as indicated in Fig. 8. The shift handle and cam 180, 181 have a corresponding number of definite positions, so that when (say) an ordinary Roman-faced type is to be cast, the trough 5 can be set in position to receive the selector from the magazine chute 4ª at the normal level, when an italic-faced type is required, the trough can be lowered to allow the selector to travel at the intermediate level, and when a black-faced type is called for, the trough can be lowered another step so that the selector may travel at the highest level, and so on. The trough 5 must however always be brought to alinement with the trough 9 before the transference of the selectors from one to the other takes place.

As each selector comes into position at the forward end of the trough 9, and before it is transferred thence to its final operative position 1ª (Fig. 11) relatively to the clamping-box 32, the selector, if then traveling at a level higher than normal, encounters, and actuates (through the medium of spring-pressed thrust-pins 185, 186 carried by the pusher 30 at correspondingly different levels) levers 187 188 serving to open valves or operate triggers adapted to control (preferably pneumatically-actuated) mechanism whereby the operation of the pusher 179 employed to displace the carriage 85 is brought about and the effective length of its stroke determined. Thus for example, the pusher 179 may have a constant minimum stroke which is repeated each time a selector performs its function, the pusher however having no effect upon the carriage 85 so long as the selector happens to be traveling along the trough 9 at normal level. When, however, a selector travels above this level, it can only reach its operative position 1ª relatively to the clamping box 32 after actuating so many of the thrust-pins 185, 186 as are then presented in its path, the action of each thrust-pin having for effect to bring about (say) the interposition between the pusher and carriage, of a spring-retracted block 189 or 190 of less or greater thickness adapted to cause the stroke of the pusher 179 to displace the carriage 85 to the less or greater extent required to bring to casting position that one of the row of matrices 120 on the die 119, which was predetermined by the movement of the shift-handle 180 already referred to.

The thrust pins 185, 186, are located at relatively different levels so that selectors delivered in the lowest position will escape both pins; those delivered at the next higher or intermediate level will engage pin 185; and those delivered at the highest level will engage both pins 185, 186.

After passing the thrust-pins 185, 186, each selector (if previously traveling at a different level) is permitted or caused to return to normal level in readiness for presentation to the clamping box 32 in the manner before described. The consequent release of the thrust-pins 185, 186 serves to permit of the withdrawal of the blocks 189, 190 from operative position and the restoration of the carriage 85 (and therefore of the die-bars 73) to normal position under the action of a spring or springs (not shown) after the type designated by the selector has been cast, the block or blocks 189, 190, which have been designated by the engagement of the selector with the pins 185, 186, prior to its presentation to the clamping box being retained in position until after the indicated type has been cast.

For the purpose of insuring the restoration of each selector to normal level after it has actuated one or more of the thrust-pins 185, 186, the selector on its way from the trough 9 to the operative position 1ª, may pass as at 191 (Figs. 11 and 12) over a step which breaks the continuity (by altering the plane) of the flat vertical surface 191ª, 191ᵇ leading from the end of the trough 9 to the face 31 of the clamping box, so that the pressure (from the finger 10) which until then had held the selector closely against the surface 38 of the recess in the face of the pusher 30 will cease, with the result that the selector will be free to drop from the more or less elevated level to the normal level in readiness to enter between the upper and lower guides 44, 45. In order to assist this action while at the same time insuring that the selector, as it drops, shall enter between the guides 44 and 45, the pusher 30, which is of a height sufficient to receive the selectors from the trough 9 at all levels, may have in its recessed face 38 a yielding panel 192 pressed forward by springs as at 193. This panel is adapted to first yield so as to allow the selector to be at first forced, by the pressure of the finger 10, close against the face 38 of the pusher and the surface 191ª before reaching the step 191 and, after the selector has passed the step 191, the panel 192 is adapted to maintain the selector in contact with the surface 191ᵇ without actual pressure but sufficiently closely to insure entrance of the selector between the guides 44, 45. The assembly trough 5 is always returned to position to receive the selectors from the magazine chute 4ª at normal level. In the event of a passage of considerable length requiring to be printed in other than the normal face of type, the selectors representing this passage may be all assembled in the trough 5 at normal level while the carriage 85 is for the time being locked in position to cast type exhibiting the face required. A convenient means for producing this or an equivalent effect by means of automatically acting mechanism under the control of what may be termed special selectors, is illustrated in Fig. 39, wherein 189ª shows a wedge employed to temporarily displace the carriage 85 from normal position. This wedge, which is adapted to be interposed between antifriction rollers mounted on the carriage 85 and a stationary (but preferably adjustable) abutment 216 respectively, is normally retained by a spring as at 219 in the inoperative position shown, wherein it is supported in substantial alinement with a rod 218 to which it is pivotally attached and which rod is mounted to move more radially with reference to a rotary cam 220 centered upon a stationary axis 221. The periphery of the cam 220 presents a series of recesses 222 in any one of which a roller 223 on the rod 218 may normally rest, these recesses alternating with projections 224 each adapted, on being brought under the roller 223, to raise the wedge 189ª to operative position wherein it displaces the carriage 85 to the extent required, in opposition to the spring (not shown) whereby the carriage is normally retained in contact with a stop as indicated at 217.

Each time the carriage 85 is to be shifted, for example, first, so as to vary (from the normal) the "face" of the type cast, and again, so as to enable the carriage to be returned to normal position, the cam 220 is rotated through one half the angular distance separating two adjacent recesses 222 on its periphery, so as to cause the wedge 189ª to be raised to operative position or permitted to be returned by a spring as at 219 to inoperative position as the case may be. This rotation of the cam is effected by means of a special selector (not shown) devoid of holes adapted to give passage to compressed air for actuating any of the selector-bars 71, 72 for operating the die-bars 73 as already mentioned, but provided with a single hole adapted to register with corresponding special orifices in the clamping-box 32 and cap 34 respectively. The special orifice provided for this purpose in the clamping-box communicates, through a corresponding air-duct 226 with a cylinder 227 in which there is fitted to work a piston 228 whose head supports one arm 229 of a lever whose other arm 230 constitutes in effect, and is adapted to be operated by the lift-plate 76 similarly to, a catch-rod such as those 74 already described with reference to the actuation of the die-bars 73. The arm 230 for this purpose projects through a hole 231 provided in the lift-plate 76 and formed precisely similarly to the holes 75 therein as already described, the arm 230 having an adjustable collar 232 so that, when air is admitted to the cylinder 227, the piston 228 will be raised and the arm 230 will be canted from the inoperative position shown to a position such that, on the ensuing upward movement of the lift-plate 76 taking place, this arm will be pulled upwards as one therewith.

The lever 229, 230 is fulcrumed (by means of a knee joint as at 233) to a radius bar 234 centered freely about the axis 221 and having pivoted to it a spring-pressed pawl 235 which engages a ratchet wheel 236 turning concentrically and as one with the cam 220. This ratchet wheel has as many teeth as the total conjoint number of both recesses 222 and projections 224 on the cam, so that each time the arm 230 is raised by the lift-plate 76, the cam will be rotated to an extent sufficient to either cause the wedge 189ª to be raised to operative position or permitted to return therefrom, as the case may be.

When, in consequence of the special selector ceasing to be held in the clamping-box the cylinder 227 is exhausted, not only will the piston 228 be free to descend again by gravity or spring pressure, but also the arm 230 will be canted back about its fulcrum 233 (by a spring such as 237) to a position whence the collar 232 will allow it to drop to normal position along with the radius bar 234 and pawl 235 in readiness for a fresh operation.

A separate set of mechanism constructed substantially as just described with reference to Fig. 39 would be provided for each additional set of type-matrices (beyond the ordinary or normal face) provided on the type-bars 73, a corresponding set of special selectors being also required. It will be obvious that the positions of the holes in the several sets of such selectors must differ in accordance with the requirements of the respective pneumatic cylinders 227, equivalent orifices in corresponding positions being provided in the clamping-box 32 and cap 34, while the effective thickness of the several wedges such as 189ª must also differ according to the respective distances to which it is required to displace the carriage 85.

It will be seen from the above that each time it is required to alter the "face" of the type to be cast, it is only necessary to introduce into the assemblage of what may be termed "ordinary (or type) selectors" in the trough 5 (by means of an appropriate key on the keyboard) one of the "special (or shift) selectors" whose action has just been described, the effect of such introduction of a special selector being permanent until a fresh special selector has been introduced. Hence the arrangement just described will suffice not only (as already mentioned) in cases where a passage of considerable length requires to be printed in other than the normal face of type, but also in every case wherein it is necessary to alter the face of type to be cast, whether the latter be a single type or a large number of types in continuous succession. Consequently, as will be obvious, the use of the alternative arrangement substantially as described with reference to Fig. 39 would enable the assembly of the ordinary selectors on different levels in the trough 5, together with the various devices and operations employed as previously described in connection therewith for the purpose of shifting the carriage 85, to be dispensed with.

A single die 119 may serve to carry all the matrices borne by any one die-bar 73, this die having a series of V-notches 153 (corresponding to the respective matrices 120) for engagement by the point 152 of the alining knife or a separate die may be provided for each character and those pertaining to any given die-bar 73 arranged in tandem in the holder as though the multiple die were cut transversely into sections, each containing a matrix and its complemental alining notch 153. The dies 119, as already explained, may be made detachable from the die-bars 73, so that the size and style of type provided by the machine can be readily changed, the same selector serving for all sizes and styles of any one character.

Auxiliary power (preferably pneumatic) may be provided in order to relieve the operator of the heavier portion of the manual labor which would otherwise be involved in carrying out the various mechanical movements consequent upon the actuation of the composing keys a, each of the latter, when depressed, serving to bring into operation an auxiliary power relay whereby the remainder of the work is performed. For this purpose each key lever 194 (Fig. 4) may be in the form of a bell-crank fulcrumed as at 195 and adapted, as at 196, to engage a separate slide 197 which, on the key being depressed, is caused to move lengthwise in guides 198, 199, the motion of this slide being utilized to operate a universal bar 200 (common to all the keys a) whereby a valve 201 is opened to admit compressed air to a power-relay cylinder 202 whose piston thereupon actuates (through a link 203) a second universal bar 204 (also common to all the keys). The longitudinal movement of the slide 197 is further utilized to bring into operative position (relatively to the second universal bar 204) an intermediate lever 205 appertaining to that key a which was depressed and to the releasing rod 206 of the corresponding column $b$ of selectors in the magazine B, so that the particular intermediate lever 205 alone being struck by the second universal bar 204, one of the corresponding selectors will be released and permitted (or caused) by the usual anchor-escapement device as indicated at 207 to descend from the magazine into the chute $4^a$ whence it is passed to the assembly trough 5 as already explained.

Each intermediate lever 205 is preferably in the form of a slide mounted in bearings 208, 209 and constituting, as regards longitudinal movement, a continuation of the slide 197 more immediately actuated by the key-lever 194, the intermediate lever 205 being however not only adapted to slide lengthwise but also pivoted to turn about its rear end 210 in the corresponding bearing 209 in response to the movement of the second universal bar 204. By this construction the first or longitudinal movement of any intermediate lever 205 (produced directly by the depression of the corresponding key $a$ in opposition to a spring 211) serves to bring a portion 212 of this lever into position to be engaged by the second universal bar 204, the latter however remaining inoperative as regards all the other intermediate levers 205, which it fails to engage in consequence of each lever, when in the idle or normal position shown, presenting a notch 213 in the path of the bar 204.

It has been already stated that the composing keys $a$ of the keyboard A and the columns $b$ of the magazine B are arranged in groups of equal unit value. This arrangement serves to enable the unit-reckoning mechanism to be actuated through the medium of grouping bars, that is to say, sub-universal bars each actuated by any key of the group to which the grouping bar appertains. Preferably (as indicated in Fig. 4) each grouping bar 214 is actuated from any one of the releasing rods 206 of its group through the medium of the corresponding one of as many bell-crank levers 215 capable of being moved by, but incapable of moving, the respective releasing rods 206 to which they severally appertain, while the remainder of the mechanism for transmitting motion to the unit-reckoning mechanism may be substantially the same as that employed in the monotype machine.

All the pneumatic power required throughout the machine may be obtained from air compressed by a pump operated by the main cam-shaft or other portion of the driving mechanism of the machine, suitably coordinated transmission mechanism being provided for driving the pump as well as for conveying motion to the various working parts of the machine, which require mechanical actuation. Most of the parts whose active movement is alone mentioned above, may be returned, after such movement, to normal position by spring pressure.

Having thus described my invention what I claim as new and desire to secure by Letters Patent, is:—

1. In a type casting and composing machine such as described the combination of the following elements, to wit; a magazine equipped with a plurality of series of perforated selectors, the individuals of each series bearing the same number and arrangement of perforations and differing from every other series; mechanism for controlling the delivery of individual selectors from the several series; a trough or way into which the selectors are successively delivered and assembled in line; a receiving trough or way and means for transferring the line of selectors from said assembling to said receiving trough or way; a carrier in position to successively engage and remove the foremost of the assembled line of selectors; a clamping box provided with a series of ports adapted to register with the perforations in the selectors and arranged to receive the latter in succession as delivered by the carrier; and a type casting mechanism including an adjustable mold, a series of matrix carriers, and actuating devices controlled by the perforations in the selectors for bringing into action the matrix carrier corresponding therewith.

2. In a type casting and composing machine such as described, the combination of the following elements, to wit; a type casting mechanism including an adjustable mold; a series of matrix carriers each adapted to separately present its matrix to the mold and adjust or gage the latter; a selective actuating mechanism for the matrix carriers provided with two series of controlling devices whereof individual members of both series coöperate in the selection of each matrix carrier; a clamping box provided with a series of ports each in communication with one of the controlling devices of said matrix carrier actuating mechanism; a series of selectors each provided with a plurality of perforations variously disposed to represent different matrix carriers and adapted to register with corresponding ports in the clamping box; and means for assembling a line of selectors, transferring the assembled line to a receiving trough or way, and delivering successive selectors to the clamping box in the order in which they were assembled.

3. In a type casting and composing machine such as described wherein perforated selectors are employed to control the action of automatic type casting mechanism; the combination of the following elements, to wit; means for assembling a plurality of selectors representing a line of matter; a carrier operating to remove successive selectors from the assembled line; a clamping box between the relatively movable members whereof successive selectors are delivered by the carrier, said clamping box being provided with a series of ports registering with perforations in the selector, and a valve controlling the admission of pressure to said ports through the selector; and a type casting mechanism including a mold, a series of matrices, and means coupled with and controlled through the ports of the clamping box for selecting and bringing into action the matrix corresponding with the selector at the time engaged by the clamping box.

4. In a type casting and composing machine such as described wherein a series of separate selectors, each provided with perforations variously arranged to represent different characters controls the action of an automatic type casting mechanism, the combination of the following elements, to wit; a group or associated series of independent selectors representing a line of matter, each selector containing perforations variously arranged to represent characters and spaces; a type casting mechanism including a series of matrices and carriers therefor, an adjustable mold whose dimension is controlled by the matrices as presented thereto, and means for selectively presenting the matrices, one at a time, to the mold; a clamping device adapted to receive successive selectors between its opposing surfaces and provided with a pressure control valve and a series of ports registering with perforations in the selectors, said ports communicating with and controlling the matrix selecting devices; and feeding devices for withdrawing the selectors from the assembled group or series and presenting them one at a time between the opposing surfaces of the clamping device.

5. In a keyboard mechanism for a type casting and composing machine such as described for effecting the delivery of the selectors from their storing chambers or compartments in the magazine, the combination of the following elements, to wit; a reciprocatory member coupled with a key and a valve; a motor controlled by said valve; an actuating member coupled with said motor; a longitudinally reciprocatory and laterally movable member provided with an engaging shoulder normally located to one side of the path of motion of said actuating member, said reciprocatory and laterally movable member being coupled with said first named reciprocatory member and actuated by the latter to shift its engaging shoulder into the path of the actuating member; and a performing member coupled with said longitudinally reciprocatory and laterally movable member, to transmit the motion derived from said actuating member.

6. In a selector assembling mechanism for a type casting and composing machine such as described, the combination of the following elements, to wit; a series of keys; a series of reciprocatory bars, one for each key; a series of reciprocatory and laterally movable bars, each of the latter in the path of movement and engaged by one of the series of key bars; an actuator common to the series of reciprocatory and laterally movable bars, with its path of movement in a direction transverse of the series and to one side of engaging shoulders thereon; a motor coupled with said actuator; a valve controlling said motor; and valve actuating devices common to the series of key bars and adapted to be operated upon by each of the latter separately.

7. In a selector assembling or composing mechanism for type casting and composing machines such as described, the combination with a keyboard mechanism for delivering individual selectors in succession, of the following elements, to wit; a laterally movable assembly trough or way provided with a movable support for the end of the series of selectors; a relatively fixed trough or way; a carriage movable longitudinally of said fixed trough or way provided with a finger engaged by and moving with the selector support of the movable trough or way during the assembling of the selectors therein; a pusher in line with the fixed trough or way and movable longitudinally thereof; and means for effecting the withdrawal of the carriage finger as the assembled line of selectors, after being brought into alinement with the relatively fixed trough or way by the lateral movement of the assembling trough or way, is advanced by the pusher to the opposite end of the fixed trough or way.

8. In a type casting and composing machine such as described, the combination with means for effecting the delivery of successive selectors each provided with a plurality of grooves upon its edges, of an assembly trough provided with longitudinal ribs or guides, and means for adjusting the position of said assembling trough relatively to the delivery point, to present said ribs or guides in line with either set of selector grooves.

9. In a type casting and composing machine provided with a selector delivering device or pusher and in combination therewith the following elements, to wit; a vertically movable assembling trough, an independently mounted selector support 6 movable longitudinally of the assembling trough; a receiving trough located to one side of the selector delivering device and into alinement with which the assembling trough is brought by a lateral movement; a carriage supported to reciprocate in parallel with the receiving trough and carrying a finger (7) movable longitudinally of the receiving trough; a cam engaging said finger to retract the latter as it approaches the far end of the receiving trough; and a pusher (10) movable longitudinally of the assembling and receiving troughs when in alinement to grasp the assembled line of selectors between said finger and pusher and transfer the same to the opposite end of the receiving trough.

10. A selector assembling and transporting mechanism for type casting and composing machines such as described, including, in combination, the following elements; to wit; an assembling trough or way movable relatively to the delivery channel; a receiving trough or way into which the line of selectors is transferred from the assembling trough when the two troughs are in alinement; a line sustaining finger supported upon a carriage movable longitudinally of the receiving trough and provided with a retracting spring; a line pusher opposed to said sustaining finger; a motor for said pusher; a valve controlling said motor; and actuating devices for said valve adapted to be engaged by the line assembling trough when brought into alinement with the receiving trough, to advance the pusher and transfer the line to the receiving trough.

11. A selector assembling and transporting mechanism for type casting and composing machines such as described including, in combination, the following elements; to wit; an assembling trough movable between selector delivering devices and a receiving trough; a carriage provided with a line supporting finger movable longitudinally and laterally of the receiving trough; a pusher opposed to said supporting finger; a motor coupled with said pusher and provided with a control valve; and actuating devices for said valve engaged by the line assembling trough and the line supporting finger carriage, alternately, to reverse the movements of the pusher.

12. A selector assembling and transporting mechanism for type casting and composing machines such as described including, in combination, the following elements; to wit; an assembling trough movable between the selector delivering devices and a line receiving trough; a carriage movable longitudinally of the receiving trough and provided with a line support; a line pusher opposed to said line support; a motor coupled with said pusher and provided with a reversing valve; and actuating devices for said valve movable in one direction by the assembling trough and in the opposite direction by the line support carriage.

13. In a type casting and composing machine such as described, the combination of the following elements, to wit; a movable carriage supporting a series of matrix carriers having a common centering point and each equipped with a matrix block containing a plurality of matrix cavities; a mold located at the centering point of the matrix carriers; and means for shifting the carriage to bring the different matrix cavities into alinement with the mold.

14. In a type casting and composing machine such as described, the combination of the following elements, to wit; a mold; a series of matrix carriers each provided with a plurality of matrix cavities and individually movable to contact with the mold; a carriage supporting said matrix carriers and movable relatively to the mold to present the different matrix cavities thereto; actuating means for shifting the said carriage to aline the different matrix cavities with the mold; actuating devices for the matrix carriers including a plurality of selective control pistons; and a clamping box, for receiving perforated selectors, provided with a series of ports each communicating with one of said selective control pistons or with the controlling devices of the carriage shifting means, to enable the selectors to designate the particular carrier as well as the particular matrix cavity borne thereby for presentation to the mold.

15. In a type casting and composing machine such as described the combination of the following elements, to wit; a mold provided with a movable mold-blade and a fixed abutment; a series of movable carriers each provided with a matrix block of a width corresponding with or proportional to that of the character represented; means for selectively presenting the individual matrices to the mold in proximity to the fixed abutments; a sizing plate coupled with the mold blade and provided with a spring buffer for engaging the matrix opposite the fixed abutment; and means for advancing the mold blade.

16. In a type casting and composing machine such as described, the combination of the following elements, to wit; a series of individual selectors each provided with perforations representing, by their location and arrangement, the different characters and spaces of a font of type; a compression box for the reception of individual selectors, provided with a series of ports corresponding in position with the perforations in the series of selectors; a series of matrix blocks, each of a width proportional to its character and mounted upon a separate carrier; a mold provided with a movable mold blade and fixed abutment; means controlled through the ports of the compression box for selectively presenting separate matrices to the mold in proximity to said fixed abutment, and a sizing member coupled with the mold-blade and engaging matrix.

17. In a type casting and composing machine such as described, the combination of the following elements, to wit; a mold provided with a movable mold blade and a fixed abutment; a series of matrix blocks each of a width corresponding with or proportional to the character represented; means for selectively presenting individual matrices to the mold in proximity to its fixed abutment; a sizing member coupled with the mold blade and movable therewith to clamp the selected matrix against the abutment; and means for controlling the presentation of successive matrices to the mold including a series of perforated selectors, and opposed clamping members whereof one clamping member is provided with a series of ports registering with the perforations in the selectors and communicating with the selective members of the matrix actuating devices, while the other clamping member is furnished with a pressure control valve and means for causing the admission of pressure to the selector when the latter is seated and clamped between said members.

18. In a type casting and composing machine such as described, the combination of the following elements, to wit; a mold provided with a movable mold blade and stationary abutment; a sizing plate opposing said abutment and coupled with the mold-blade; a series of matrices each supported on a carrier and dimensioned to correspond with the character contained therein; and means for selectively presenting said matrices, one at a time, to the mold and between the abutment and sizing plate.

19. In a type casting and composing machine such as described the combination of the following elements, to wit; a mold provided with a movable mold-blade, a stationary abutment and an opposed sizing member, the latter coupled with the mold-blade; a series of matrices each mounted upon a movable carrier, dimensioned to correspond with the width of its character, and adapted to be moved into contact with the mold between the abutment and sizing member; and an auxiliary adjustable sizing member held normally removed from the path of the mold blade sizing member and adapted to be moved into said path to arrest the mold blade.

20. In a type casting and composing machine such as described the combination of the following elements, to wit; a mold provided with a movable mold-blade, an abutment and an opposed sizing plate, the latter coupled with the mold-blade; a series of matrices separately movable into contact with the mold between the abutment and sizing plate; and an auxiliary adjustable sizing member adapted to be engaged by certain of the matrices to move it into the path of the mold blade sizing member.

21. In a type casting and composing machine such as described provided with mold and matrix carriers, the latter movable towards and from the mold in a direction longitudinally of the casting groove and in combination therewith a centering device adapted to engage the rear face of the matrix and movable in two directions, the one laterally of the path traversed by the matrix or its carrier and the other longitudinally of said path.

22. In a type casting and composing machine such as described, the combination of the following elements, to wit: a mold, a series of matrix carriers each provided with a matrix block movable towards and from the mold; a centering member adapted to engage the back of the matrix and clamp the latter on the open end of the mold cavity; and means for shifting said centering member both laterally and longitudinally of the path traversed by the matrix blocks in approaching the mold.

23. In a type casting and composing machine such as described the combination of the following elements, to wit; a mold; a plurality of separately movable matrix carriers; and an alining member adapted to engage a seat on the matrix, to hold the latter in position on the mold, said alining member being pivotally attached to a reciprocating member and engaging a cam, the latter operating to hold the engaging portion of the alining member in a path perpendicular to the matrix seat on the mold, and to shift said engaging portion laterally as it is withdrawn from the matrix.

24. In a type casting and composing machine such as described, the combination with the matrix carrier, of a matrix holder detachably secured to said carrier and provided with a transverse slot or socket and a flanged matrix or die plate located and held within said slot or socket.

25. In a type casting and composing machine such as described, a matrix carrier provided with a transversely slotted detachable holder and a flanged matrix or die plate supported within the slot in said holder and permitted a slight degree of longitudinal movement therein.

26. In a type casting and composing machine such as described, the combination of the following elements, to wit; a plurality of matrices; a mold, common to all the matrices, provided with a movable dimensioning member; a sizing member coupled with the mold dimensioning member for engaging a matrix seated on the mold; and an auxiliary adjustable gaging member movable into and out of the path of said sizing member.

27. In a type casting and composing machine such as described, provided with an adjustable mold and a plurality of matrices adapted to be separately presented to the mold, the character bearing matrices engaging the mold adjusting devices to dimension the mold, and in combination therewith an auxiliary gaging device adapted to be engaged by the blank or space matrices and moved into the path of the mold adjusting devices.

28. In a type casting and composing machine such as described, the combination of the following elements, to wit; a mold provided with a movable mold-blade; an abutment located in proximity to the matrix seat; a sizing slide opposite said abutment and coupled with the mold-blade to move in unison therewith; and an adjustable wedge mounted upon a frame and movable bodily transversely of the path of the sizing slide, to intercept the latter and dimension the mold.

29. In a type casting and composing machine such as described, the combination of the following elements, to wit; a mold provided with a movable mold-blade; an abutment located in proximity to the matrix seat; a sizing slide, opposing said abutment; provided with a yielding buffer and coupled to move in unison with the mold-blade; an auxiliary adjustable member normally held to one side of but adapted to be interposed in the path traversed by said sizing slide.

30. In a type casting and composing machine such as described, provided with an adjustable mold and a plurality of independent matrices, each dimensioned to correspond with the character represented thereby and adapted to be seated upon the mold, and in combination therewith, opposing clamping members located on opposite sides of the matrix seat, the one coupled to move with the adjusting member of the mold, to clamp the matrix seated on the mold, and the other held in fixed relation during the clamping action, but movable laterally to facilitate the passage of the matrix to its seat in the mold.

31. In a type casting and composing machine such as described provided with a mold, a plurality of independently movable matrix carriers, and a clamping device for the reception of perforated selectors, one member of said clamping device being equipped with a series of ports registering with perforations in the selectors, and in combination therewith the following elements, to wit; a plurality of catch rods, one for each matrix carrier, arranged in rows in two directions on intersecting lines; a lift plate provided with an engaging bearing for each catch rod but normally free of the latter; two series or sets of selector bars in transverse relation, each bar of one set provided with radius arms adjacent the catch rods of the corresponding row, and each bar of the other set provided with shoulders adjacent the radius arms pertaining to one of the transverse row of catch rods; a series of motors, one for each selector bar; and connections between each motor and one of the ports of the selector clamping device.

In testimony whereof I have signed my name to this specification in the presence of two subscribing witnesses.

R. C. ELLIOTT.

Witnesses:
H. D. JAMESON,
WM. J. DOW.